US008477716B2

(12) United States Patent
Gossain et al.

(10) Patent No.: US 8,477,716 B2
(45) Date of Patent: Jul. 2, 2013

(54) METHOD FOR FACILITATING SHARING OF CHANNEL INFORMATION IN A WIRELESS COMMUNICATION NETWORK

(75) Inventors: Hrishikesh Gossain, Lake Mary, FL (US); Michael S. Johnson, Orlando, FL (US); Eric S. Reifsnider, Corvallis, OR (US)

(73) Assignee: Motorola Solutions, Inc., Schaumburg, IL (US)

( * ) Notice: Subject to any disclaimer, the term of this patent is extended or adjusted under 35 U.S.C. 154(b) by 1173 days.

(21) Appl. No.: 12/125,588

(22) Filed: May 22, 2008

(65) Prior Publication Data
US 2009/0290518 A1 Nov. 26, 2009

(51) Int. Cl.
*H04B 7/212* (2006.01)

(52) U.S. Cl.
USPC .......................................... 370/331; 370/332

(58) Field of Classification Search
USPC ................................... 370/331, 332
See application file for complete search history.

(56) References Cited

U.S. PATENT DOCUMENTS

| 7,564,826 | B2 * | 7/2009 | Sherman et al. | 370/338 |
|---|---|---|---|---|
| 7,570,951 | B2 | 8/2009 | Classon et al. | |
| 7,633,901 | B2 * | 12/2009 | Yuen et al. | 370/329 |
| 7,684,464 | B2 * | 3/2010 | Linsky et al. | 375/132 |
| 7,738,374 | B2 * | 6/2010 | Yagyu et al. | 370/232 |
| 7,907,566 | B2 * | 3/2011 | Ohuchi | 370/329 |
| 7,990,863 | B2 * | 8/2011 | Yagyu et al. | 370/232 |
| 2002/0097696 | A1 * | 7/2002 | Kossi et al. | 370/330 |
| 2005/0013275 | A1 | 1/2005 | Black et al. | |
| 2005/0259671 | A1 * | 11/2005 | Jung et al. | 370/410 |
| 2006/0010981 | A1 | 1/2006 | Tadashi et al. | |
| 2006/0109815 | A1 * | 5/2006 | Ozer et al. | 370/329 |
| 2006/0126514 | A1 * | 6/2006 | Lee et al. | 370/238 |
| 2006/0274743 | A1 * | 12/2006 | Yegin et al. | 370/389 |
| 2007/0014269 | A1 * | 1/2007 | Sherman et al. | 370/338 |
| 2007/0070966 | A1 * | 3/2007 | Sung et al. | 370/338 |
| 2007/0183374 | A1 * | 8/2007 | Classon et al. | 370/338 |
| 2007/0213029 | A1 * | 9/2007 | Edney et al. | 455/404.1 |
| 2007/0286143 | A1 * | 12/2007 | Olson et al. | 370/338 |

(Continued)

FOREIGN PATENT DOCUMENTS

| CN | 1719931 A | 1/2006 |
|---|---|---|
| KR | 10-2005-0027098 A | 3/2005 |

OTHER PUBLICATIONS

IEEE 802.11h—2003—Part 11: Wireless LAN Medium Access Control (MAC) and Physical Layer (PHY) Specifications—Amendment 5: Spectrum and Transmit Power Management Extensions in the 5 GHz band in Europe—Sections 7.3.2.19 through 7.3.2.22.3 (pp. 13-21).

(Continued)

*Primary Examiner* — Faruk Hamza
*Assistant Examiner* — Jay P. Patel
(74) *Attorney, Agent, or Firm* — Steven A. May

(57) ABSTRACT

A method of operation of a node for obtaining channel information in a wireless communication network is disclosed. The method includes receiving periodically, information related to channel assessment capability of plurality of nodes of the wireless communication network, maintaining a metric characterizing the channel assessment capability for each of the plurality of nodes based on the received channel assessment capability, selecting at least one node from the plurality of nodes by comparing the metric of each of the plurality of nodes, sending a request for channel information to the selected node and receiving channel information from the selected node.

30 Claims, 12 Drawing Sheets

U.S. PATENT DOCUMENTS

2008/0069059 A1* 3/2008 Yagyu et al. .................. 370/336
2008/0076419 A1* 3/2008 Khetawat et al. .......... 455/435.1
2008/0113640 A1* 5/2008 Bennett ........................ 455/303
2008/0253327 A1* 10/2008 Kohvakka et al. ............ 370/330
2008/0305792 A1* 12/2008 Khetawat et al. .......... 455/435.1

OTHER PUBLICATIONS

PCT/US2009/044585—International Search Report with Written Opinion, mailing date Jun. 11, 2010—11 pages.

Corresponding Australian Application No. 2009249140—Examination Report dated Aug. 17, 2012—3 pages.

International Preliminary Report on Patentability for counterpart International Application No. PCT/US2009/044585 mailed on Dec. 2, 2010.

Corresponding Chinese Patent Application No. 200980118658.X—Translation of First Office Action, mailed Jan. 23, 2013.

* cited by examiner

FIG. 3

| ELEMENT ID | LENGTH | CHANNEL ASSESSMENT CAPABILITY |
|---|---|---|
| 310 | 315 | 320 |

| ELEMENT ID | LENGTH | MEASUREMENT TOKEN | CHANNEL ID (I) | MEASUREMENT TYPE (1), MEASUREMENT TYPE (2), ... MEASUREMENT TYPE (N) | LIST OF NEIGHBORS (0-N) |
|---|---|---|---|---|---|
| 410 | 415 | 420 | 425 | 430 | 435 |

| ELEMENT ID | LENGTH | MEASUREMENT TOKEN | CHANNEL ID (I) | MEASUREMENT TYPE (1), MEASUREMENT TYPE (2), ... MEASUREMENT TYPE (N) | REPORT (1), REPORT (2), ... REPORT (N) |
|---|---|---|---|---|---|
| 510 | 515 | 520 | 525 | 530 | 535 |

500

METHOD FOR FACILITATING SHARING OF CHANNEL INFORMATION IN A WIRELESS COMMUNICATION NETWORK

FIELD OF THE DISCLOSURE

The present disclosure relates generally to wireless communication networks and more particularly to a method for facilitating sharing of channel information in such wireless communication networks.

BACKGROUND

In wireless communication networks, each communication device may periodically perform a channel assessment for various channels that are potentially available for it use, or to determine which channels are currently in use. The information gained from such a channel assessment provide a mechanism for the communication devices to decide which access point it is desirable to associate with, and/or which channel to use, or if already associated, which other access point it may be desirable to transfer to for reasons of better signal strength, less channel congestion, etc. Channel assessment operations ca require significant amount of time from the communication device, during which time it may be unavailable for normal data communications. Such channel assessment also consumes resources within the communication device, such as battery power, that would otherwise be available for other uses.

Presently, it is problematic to perform channel assessment at a communication device where there are no associated stations without affecting the performance of other communication devices. For example, if a communication device scans alternative channels within its communication network for better connectivity, the performance of associated communication devices which were connected to other devices through the scanning communication device can be affected during the entire scanning period. For example, while a communication device is sampling channels and listening for network traffic, it cannot also route network traffic from its associated station or from other communication devices. In wireless network such as mesh networks, where one or more mesh devices have associated stations the associated stations can be requested to perform channel assessment. However, devices which are required to perform frequent channel assessment because of problems such as interference in the current channel also have problems forming associations with station. Therefore, it is inefficient to have many devices performing channel assessments in a given location.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 3 illustrates a frame structure of a channel assessment capability.

FIG. 4 illustrates a frame structure of a channel study request.

FIG. 5 illustrates a frame structure of a channel study report.

Figure 1:
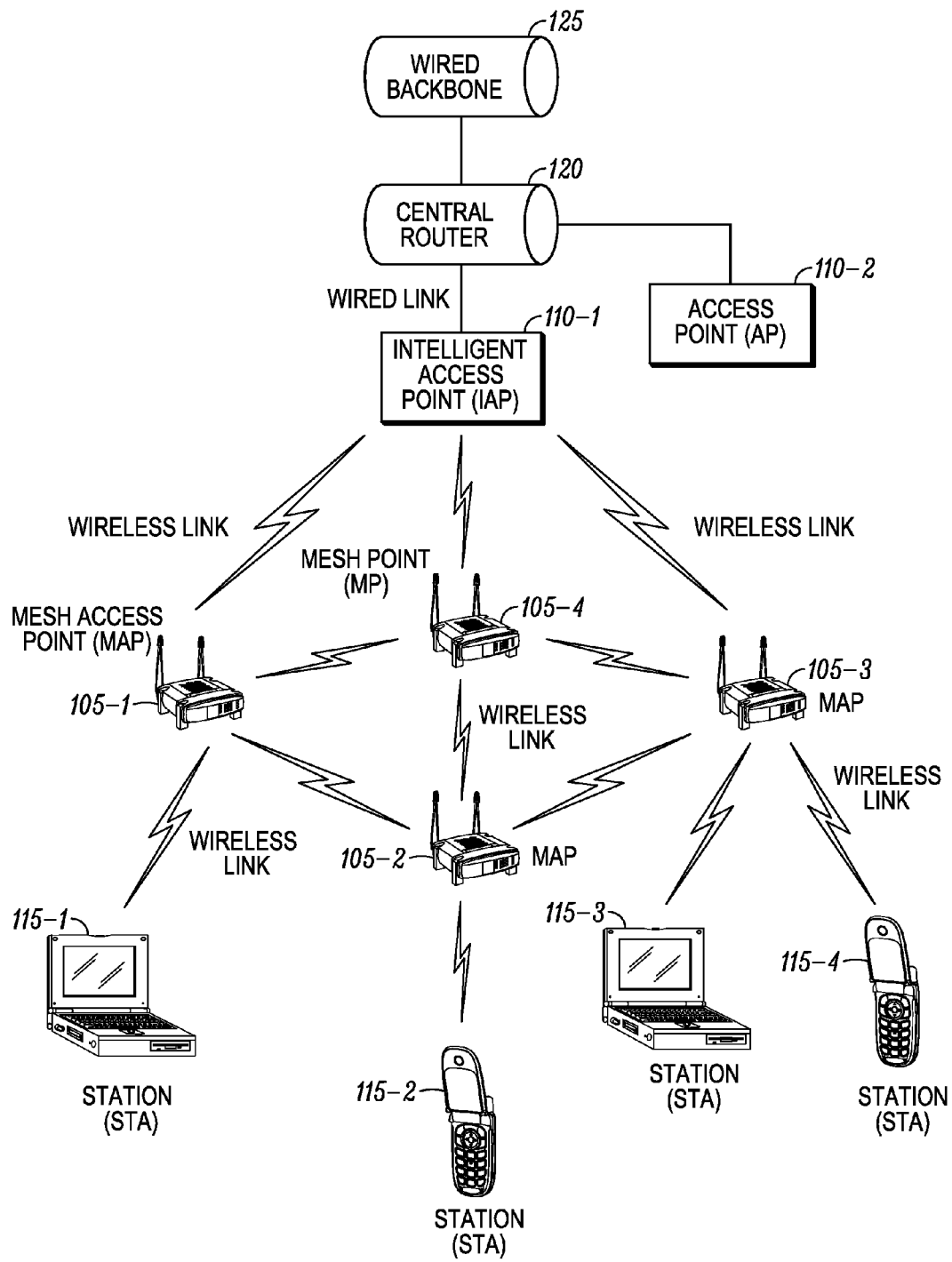
FIG. 1 is a block diagram of a communication network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure is directed towards a method of operation of a node for obtaining channel information in a wireless communication network. The method includes receiving periodically, information related to channel assessment capability of plurality of nodes of the wireless communication network, maintaining a metric characterizing the channel assessment capability for each of the plurality of nodes based on the received channel assessment capability, selecting at least one node from the plurality of nodes by comparing the metric of each of the plurality of nodes, sending a request for channel information to the selected node and receiving channel information from the selected node.

FIG. 1 is a block diagram illustrating an example communication network employed in a method in accordance with some embodiments. Specifically, FIG. 1 illustrates a wireless communication network such as a wireless mesh network 100. The wireless mesh network 100, for example, can be a mesh enabled architecture (MEA) network or an 802.11 network (i.e. 802.11a, 802.11b, 802.11g, or 802.11s). (For any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the wireless mesh network 100 in accordance with some embodiments can alternatively comprise any packetized communication network where packets are forwarded across multiple wireless hops. For example, the wireless mesh network 100 can be a network utilizing packet data protocols such as GPRS (General Packet Radio Service), EGPRS (Enhanced GPRS), X.25 (an International Telecommunication Union Telecommunications Standardization Sector (ITU-T) standard network layer protocol for packet switched wide area network communication) and frame relay (data transmission technique used to send digital information in a relay of frames to one or many destinations from one or many end-points). Additionally, each wireless hop of the wireless mesh network 100 may either employ the same packet data protocol as the other hops, or a unique packet data protocol per hop. As used herein, the term "mesh networks" shall be understood to refer to self-forming, multi-hop wireless communication networks including a number of nodes which can operate with or without any fixed infrastructure, and in some cases the mesh network is formed entirely of mobile nodes.

As illustrated in FIG. 1, the wireless mesh network 100 includes a plurality of mesh nodes 105-1 through 105-4 (referred to also as nodes 105, or mesh nodes 105), used to route data packets from one or more intelligent access points 110-1 and 110-2 (referred to also as IAPs 110, or access points (APs) 110, or central authority 110) to one or more wireless subscriber devices 115-1 through 115-4 (referred to also as STA 115). In accordance with some embodiments, the one or more IAPs 110 then route the packets to a central router 120. The central router 120 is coupled to a wired backbone 125. The central router 120 has a wired connection to IAPs 110. The central router 120 is used to connect IAPs 110 to wired backbone 125 for access to other networks or Internet. As used herein, the term "intelligent access points" shall be understood to refer to infrastructure based nodes used to provide access to mesh nodes 105. In one embodiment, the IAP 110 can be configured as an IEEE 802.11s mesh portal (MPP).

The mesh nodes 105 are mobile or fixed devices that do not have a wired connection to the wired backbone 125. In other words, the mesh nodes 105 are wirelessly connected to the wired backbone 125 via the intelligent access points 110. As shown in FIG. 1, the mesh nodes 105 include mesh access points (MAPs) 105-1 through 105-3, and mesh point 105-4. As used herein, the term "mesh point" refers to a mobile or fixed device provisioned with mesh functionality, wherein the mesh functionality allows neighboring devices to join the mesh (e.g. wireless mesh network 100 using mesh routing). The term "mesh access point" shall be understood to refer to a mobile or fixed device provisioned with both mesh functionality and access point functionality, wherein the mesh functionality allows neighboring devices to join the mesh (e.g. wireless mesh network 100 using mesh routing), and the access point functionality supports 802.11 STA access.

It will be appreciated by those of ordinary skill in the art that any number of mesh access points 105-*n*, mesh points 105-*n*, intelligent access points 110-*n*, and wireless subscriber devices 115-*n* can be utilized within the wireless mesh network 100 in accordance with the embodiments, and that the quantity of such devices in FIG. 1 are for illustrative purposes only. In accordance with some embodiments, the wireless mesh network 100 facilitates a mesh node 105 to assess channels in its neighborhood and share channel information to other mesh nodes 105 and IAPs 110 within the wireless mesh network 100.

Figure 2:
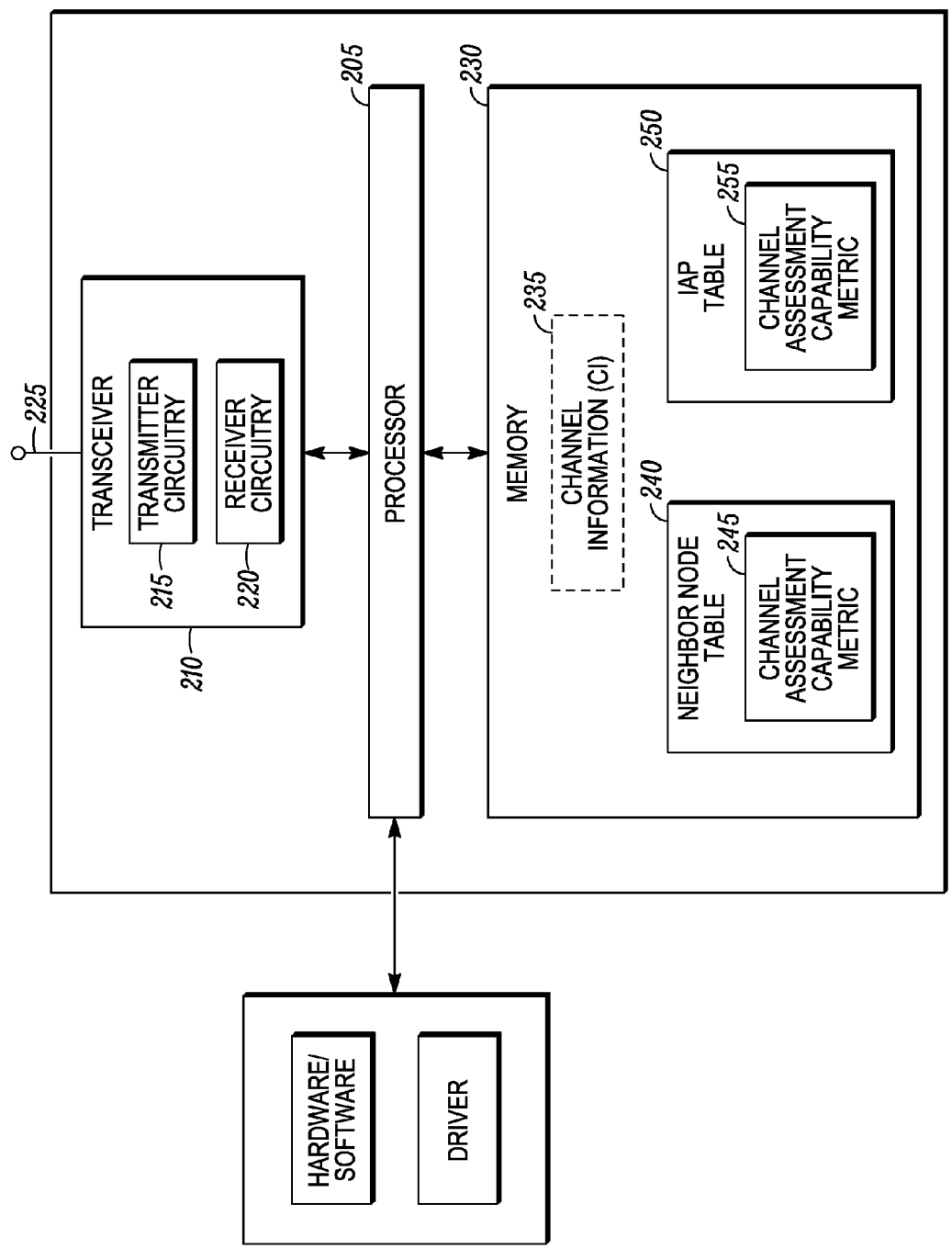
FIG. 2 is a block diagram illustrating a node employed in the communication network shown in FIG. 1.

FIG. 2 is a block diagram of a node 200 according to one implementation. The node 200, for example, can be implemented in mesh nodes 105 and/or IAPs 110. In one embodiment, the node 200 can also be implemented as switch, or a router, or a central network authority. The node 200 includes a processor 205, a transceiver 210 including a transmitter circuitry 215 and a receiver circuitry 220, an antenna 225, a memory 230 for storing operating instructions that are executed by the processor 205, channel information 235, a neighbor node table 240 including a channel assessment capability metric 245 for each neighbor node, and an IAP table 250 including channel assessment capability metric 255 for each IAP within the wireless mesh network 100. Although not shown, the node 200 also can include an antenna switch, duplexer, circulator, or other highly isolative means (not shown) for intermittently providing information packets from the transmitter circuitry 215 to the antenna 225 and from the antenna 225 to the receiver circuitry 220. The node 200 can comprise an integrated unit containing at least all the elements depicted in FIG. 2, as well as any other elements necessary for the node 200 to perform its particular electronic function. Alternatively, the node 200 can comprise a collection of appropriately interconnected units or devices, wherein such units or devices perform functions that are equivalent to the functions performed by the elements of the node 200.

The processor 205 includes one or more microprocessors, microcontrollers, DSPs (digital signal processors), state machines, logic circuitry, or any other device or devices that process information based on operational or programming instructions. Such operational or programming instructions are stored in the memory 230. The memory 230 can be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing digital information. One of ordinary skill in the art will recognize that when the processor 205 has one or more of its functions performed by a state machine or logic circuitry, the memory 230 containing the corresponding operational instructions can be embedded within the state machine or logic circuitry. The operations performed by the processor 205 and the other elements of the node 200 are described in detail below.

The transmitter circuitry 215 and the receiver circuitry 220 enable the node 200 to communicate information packets to and acquire information packets from the other nodes. In this regard, the transmitter circuitry 215 and the receiver circuitry 220 include appropriate, conventional circuitry to enable digital or analog transmissions over a wireless communication channel. The transmitter circuitry 215 and the receiver circuitry 220 can operate over an ad hoc networking air interface (e.g., Bluetooth, IEEE 802.11, IEEE 802.15, and the like).

The implementations of the transmitter circuitry 215 and the receiver circuitry 220 depend on the implementation of the node 200. For example, the transmitter circuitry 215 and the receiver circuitry 220 can be implemented as an appropriate wireless modem, or as conventional transmitting and receiving components of two-way wireless communication devices. In the event that the transmitter circuitry 215 and the receiver circuitry 220 are implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the transmitter circuitry 215 and the receiver circuitry 220 can be implemented as part of the wireless device hardware and software architecture in accordance with known techniques. One of ordinary skill in the art will recognize that most, if not all, of the functions of the transmitter circuitry 215 and/or the receiver circuitry 220 can be implemented in a processor, such as the processor 205. However, the processor 205, the transmitter circuitry 215, and the receiver circuitry 220 have been artificially partitioned herein to facilitate a better understanding.

The receiver circuitry 220 operates to receive communication signals (such as radio frequency (RF) signals) from at least one frequency band and optionally multiple frequency bands, when, for example, the communications with a proximate device are in a frequency band other than that of the network communications. The receiver circuitry 220 can optionally comprise a first receiver and a second receiver, or one receiver for receiving communication signals in two or more frequency bands. The receiver 220, depending on the mode of operation, can be tuned to receive, for example, Bluetooth or wireless local area network (WLAN), such as IEEE 802.11, communication signals. The transceiver 210 includes one set of transmitter circuitry 215. The transmitter 215 can transmit to multiple devices in one or in multiple frequency bands. The antenna 225 comprises any known or developed structure for radiating and receiving electromagnetic energy in the frequency range containing the wireless carrier frequencies.

As illustrated in FIG. 2, the memory 230 stores and maintains channel information 235 of available communication channels across a physical location of the node 200. In accordance with some embodiments, the channel information 235 includes at least one or a combination of a radar signal, an unidentified signal on at least one channel for which the channel information 235 is maintained, route metric information to discovered access points or gateways, information of received signal power, information of channel bandwidth, and information of channel occupancy per unit time. In one embodiment, the node 200 obtains channel information 235 from other nodes by sending a request for channel information in a channel study request 400 (see FIG. 4). The node 200 can share the obtained channel information 235 with other nodes of the wireless mesh network 100. In another embodiment, the node 200 can perform channel assessment itself, and thereafter share the channel information 235 with other nodes of the wireless mesh network 100. In this case, the node 200 can proactively report channel information 235 to other nodes via a channel study report 500 (see FIG. 5). As used herein, the term "channel assessment" shall be understood to refer to a process of generating or updating channel information 235. In one example, channel assessment is performed by actively scanning channels by ceasing transmission on all channels and then sampling the signals on each channel for a specified time period. In another example, channel assessment is performed opportunistically by scanning the channel currently being used for data transmission without ceasing data transmissions on the current channel by using suitable gaps in the data stream to sample signals present on the current channel only. In yet another example, channel assessment is performed during the signal processing stages of reception of a data transmission by assessing signal characteristics of the channel as an incidental by-product where available due to the nature of signal processing for a particular technology.

In accordance with some embodiments, the node 200 periodically receives information related to channel assessment capability of at least one node of the wireless mesh network 100. In one example, the node 200 receives information related to channel assessment capability via channel assessment capability (see FIG. 3). The received channel assessment capability indicates the willingness of a node to perform channel assessment and/or share channel information 235. In one embodiment, the node 200 periodically receives information related to channel assessment capability of each of the neighbor nodes of the node 200, and maintains a neighbor node table 240 including a metric 245 (also referred to as channel assessment capability metric 245) characterizing the channel assessment capability of each of the neighbor nodes based on the received channel assessment capability. In this embodiment, the node 200 also receives channel assessment capability information from nodes, for example IAPs 110, that are multi-hop away from the node 200, and maintains a IAP table 250 including a metric 255 (also referred to as channel assessment capability metric 255) characterizing the channel assessment capability of each of the IAPs 110 based on the received channel assessment capability. As used herein, the term "neighbor node" of node 200 shall be understood to refer to a node that is in a direct communication range of the node 200 (e.g., a single-hop logical link exists between the node 200 and the neighbor node). In accordance with other embodiments, the neighbor node may also refer to a node that is within the coverage area or neighborhood of the node 200. As can be appreciated by a person skilled in the art, channel information 235 maintained by nodes that are in the same physical location will tend to be similar.

FIG. 3 illustrates a channel assessment capability frame structure 300 used by nodes for providing channel assessment capability information to other nodes of the wireless mesh network, according to one implementation. In one embodiment, the node 200 includes the channel assessment capability frame structure 300 in a beacon or a probe response for providing channel information 235 to other nodes of the wireless network. As shown in FIG. 3, the channel assessment capability frame structure 300 includes element identification (ID) 310, a length 315, and a channel assessment capability 320. The element ID 310 identifies the channel assessment capability 300. The length 315 indicates a length of channel assessment capability frame structure 300. The channel assessment capability 320 indicates the willingness and/or ability of the node 200 to perform channel assessment and/or provide channel information 235 to other nodes of the wireless mesh network 100. In one embodiment, the channel assessment capability 320 includes a metric and/or a flag (not shown) indicating willingness and/or ability of a node 200 to perform channel assessment and/or provide channel information 235.

In accordance with some embodiments, the channel assessment capability 320 of a node 200 is affected by the availability of a channel assessment feature on the nodes. For example, some nodes within the wireless mesh network 100 may not have the built-in capability to assess the channel characteristics and provide assessed channel information. In one example, the channel assessment capability 320 of a node 200 is affected by current or recent data transmission capacity load, that is, the relative amount of time the node 200 is on the air versus off the air. In one example, the channel assessment capability 320 of a node 200 is affected by current or recent time-averaged data throughput. In another example, the channel assessment capability 320 of a node 200 is affected by a received signal power associated with recent transmissions (i.e. the stronger the signal from the node, the closer the node is to the requesting node), and in such cases, the channel information is more likely to be similar between these two nodes. The channel assessment capability 320 of a node 200 is also affected by a reliability rating, for example, each node may have a quality of assessment ranking that express the channel assessment accuracy of the respective nodes. Further, the metric characterizing the channel assessment capability 320 of a node 200 is based at least on a channel scanning capability of the node 200 or on the channel scanning capability of at least one station 115 associated with the node 200.

FIG. 4 illustrates a frame structure of a channel study request 400 used by a node 200 to obtain channel information 235 from other nodes. As shown in FIG. 4, the frame structure of the channel study request 400 includes an element ID 410, a length 415, a measurement token 420, a channel identification (ID) 425, a measurement type 430, and a list of neighbors 435. The element ID 410 identifies the channel study request 400. The length 415 indicates a length of the channel study request 400. The measurement token 420 uniquely identifies the measurement request in the channel study request 400. For example, a first node sends multiple channel study requests 400 to a second node. In this case, the second node sends multiple channel measurement reports, and therefore in each report, the second node includes a measurement token that corresponds to the measurement token received from each channel study request 400. The channel ID 425 indicates a channel for which channel information 235 is requested. In one embodiment, when the channel information 235 for more than one channel is requested, the channel ID 425 indicates a set of channels for which channel information 235 is requested. The measurement type 430 indicates type of requested channel information. In one embodiment, the measurement type includes at least one of a scan for radar, a scan for unidentified signals, a scan for route metric to discovered access points or gateways, a scan for received power signals, a scan for channel bandwidth, and a scan for channel occupancy per unit time. The list of neighbors 435 indicates the Medium Access Control (MAC) address of the nodes, for which the channel information 235 is requested. In one embodiment, the list of neighbors 435 is used to request multiple neighbor nodes to provide channel information 235. It will be appreciated by those of ordinary skill in the art that any number of measurement types 430 can be present in channel study request 400 in accordance with some embodiments.

FIG. 5 illustrates a frame structure of a channel study report 500 used by the node 200 to provide channel information 235 to other nodes. As shown in FIG. 5, the frame structure of the channel study report 500 includes an element ID 510, length 515, a measurement token 520, a channel ID 525, a measurement type 530, and a report 535. The element ID 510 identifies the channel study report 500. The length 515 indicates a length of the channel study report 500. The measurement token 520 uniquely identifies the measurement report included in the channel study report. For example, a first node receives multiple channel study requests 400 from a second node. In this case, the first node sends multiple channel study reports 500, and therefore in each report, the second node includes a measurement token that corresponds to the measurement token received from each channel study request 400. The channel ID 525 indicates a channel for which channel information 235 is reported. In one embodiment, when the channel information 235 for more than one channel is reported, the channel ID 525 indicates a set of channels for which channel information 235 is reported. The measurement type 530 indicates the type of reported channel information. In one embodiment, the measurement type is at least one or a combination of a scan for radar, a scan for unidentified signals, a scan for route metric to discovered access points or gateways, a scan for received signal power, a scan for channel bandwidth, and a scan for channel occupancy per unit time. The report 535 includes channel information 235 corresponding to the measurement type 530. For example, the report 535 includes information related at least one or a combination of radar, unidentified signals on the at least one channel for which the channel information 235 is reported, route metric information to discovered access points or gateways, information of received signal power, information of channel bandwidth, and information of channel occupancy per unit time. It will be appreciated by those of ordinary skill in the art that any number of measurement types 530 and reports 535 can be included in the channel study report 500 in accordance with some embodiments.

Figure 6:
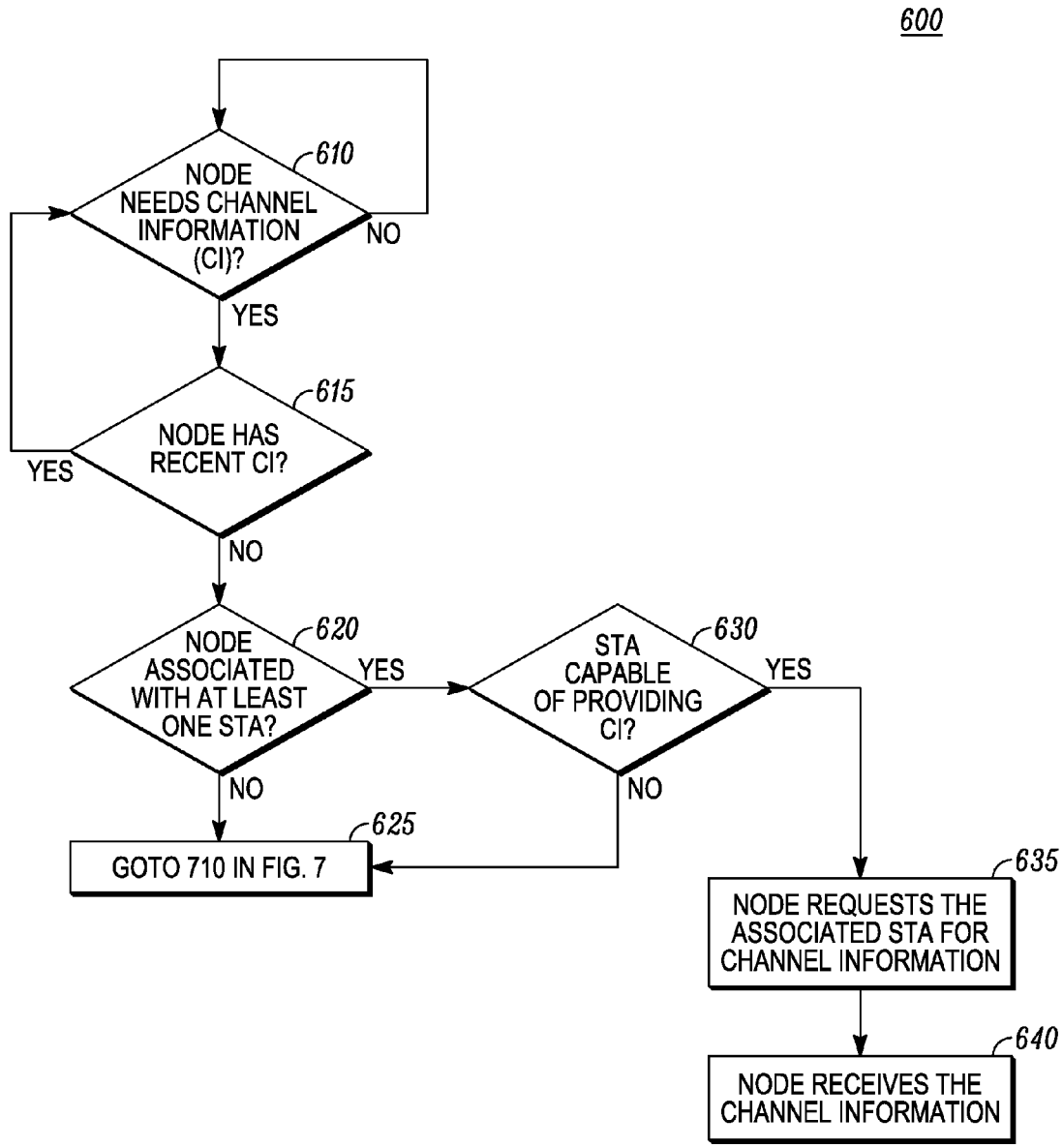
FIG. 6 is a flowchart of a method for obtaining channel information in a wireless communication network in accordance with some embodiments.

FIG. 6 is a flowchart of a method 600 for obtaining channel information 235 in a wireless communication network in accordance with some embodiments. The method 600 begins with a node 200 periodically determining whether the node 200 needs channel information 235 at step 610. For example, the node 200 may need channel information 235 to switch to another channel in the event of detecting interference in the channel currently being used. In another example, the node 200 may need channel information 235 when there is congestion in the current channel being used. In yet another example, the node 200 may need channel information 235 to connect to the wireless communication network or to connect to some another node within the wireless communication network. When the node 200 determines that the node 200 does not need channel information 235, the node 200 waits for a predefined time period and returns to step 610 to determine if the node 200 needs channel information 235. At step 610, when the node 200 determines that the node 200 needs channel information 235, the node 200 determines whether the memory 230 has recent channel information 235 as shown in step 615. When the node 200 already has recent channel information 235, the node 200 can use the channel information 235, for example, to switch to another channel having better connectivity as compared to channel currently being used. The node 200 then returns to step 610 to continue to determine whether the node 200 needs channel information 235. Returning to step 615, when the node 200 does not have the recent channel information 235, the node 200 proceeds to step 620 to determine whether there exists at least one associated station 115 for the node 200. When the node 200 has at least one associated station 115, the node 200 proceeds to step 630 to determine whether at least one associated station 115 is capable of performing channel assessment. At step 635, when the at least one associated station 115 is capable of performing channel assessment, the node 200 requests the at least one associated station 115 to perform channel assessment and provide channel information 235. In one embodiment, the node 200 requests for channel information 235 from the at least one associated station 115 by sending a measurement request to the at least one associated station 115. Next at step 640, the node 200 receives the channel information 235. In one embodiment, the node 200 receives a measurement report including the channel information 235 from the at least one associated station 115. Returning to steps 620 and step 630, when there is no associated station 115 for the node 200, or when the at least station 115 associated with the node 200 is not capable of performing channel assessment, the node 200 proceeds to step 625 to request channel information 235 from one or more neighbor nodes capable of providing channel information 235 (see step 710, FIG. 7).

Figure 7:
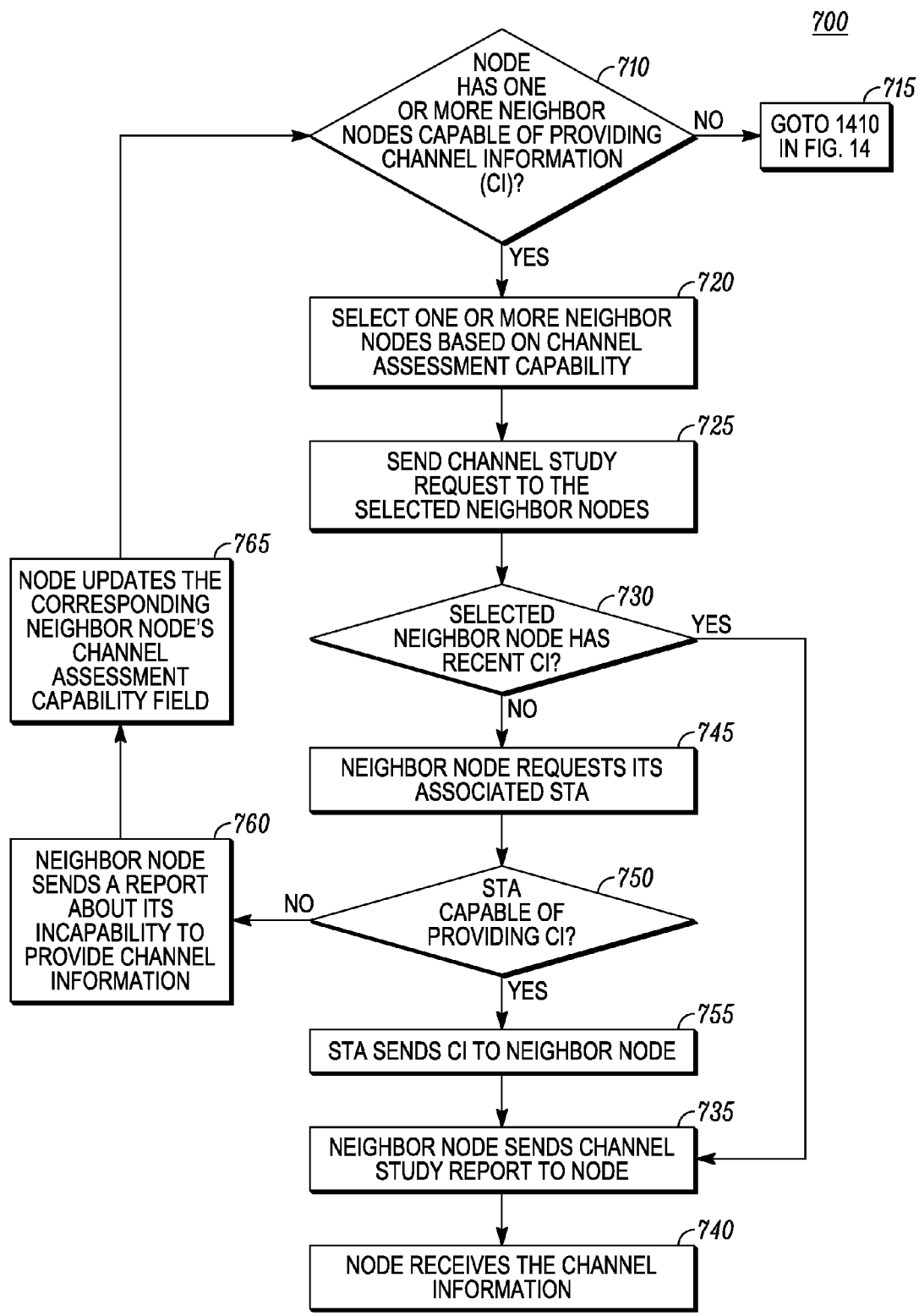
FIG. 7 is a flowchart of a method for obtaining channel information in a wireless communication network in accordance with some embodiments.

FIG. 7 is a flowchart of a method 700 for obtaining channel information 235 from a neighbor node in a wireless communication network in accordance with some embodiments. The method 700 begins at step 710 where a node 200 determines whether the node 200 has at least one or more neighbor nodes capable of providing channel information 235. When the node 200 determines that the node 200 does not have any neighbor node capable of providing channel information 235, at step 715, the node 200 proceeds to request channel information 235 from at least one other node (IAPs 110 or MAPs 105) that is multi-hop away from the node 200. (see step 1410, FIG. 14.) When the node 200 determines that the node 200 has one or more neighbor nodes capable of providing channel information 235, the node 200 proceeds to step 720 to select at least one neighbor node by comparing the channel assessment capability metric 245 of each of the neighbor nodes listed in the neighbor node table 240. After selecting at least one neighbor node, the node 200 sends a request for channel information 235, for example, via channel study request 400 to the selected neighbor node as shown in step 725. When the selected neighbor node receives the request for channel information 235 from the node 200, the neighbor node proceeds to step 730 to determine whether it has recent channel information 235. If the neighbor node itself has the recent channel information 235, then at step 735, the neighbor node sends the channel information 235, for example, via channel study report 500 to the requesting node 200. Next at step 740, the node 200 receives the channel information 235 sent by the neighbor node.

Returning to step 730, when the selected neighbor node does not have the recent channel information 235, the neighbor node proceeds to step 745 to request at least one station 115 associated with the neighbor node to perform channel assessment. At step 750, the neighbor node determines whether the associated station 115 is capable of providing channel information 235. If the associated station 115 is capable of providing channel information 235, then at step 755, the neighbor node receives channel information 235 from the associated station 115. On the other hand, if the associated station 115 is not capable of performing channel assessment and/or providing channel information 235, the neighbor node proceeds to step 760 to send a report to node 200 indicating the channel assessment incapability of the neighbor node to provide channel information 235. In response to receiving this report, at step 765, the node 200 updates the channel assessment capability metric 245 of the neighbor node in the neighbor node table 240 of the node 200.

Figure 8:
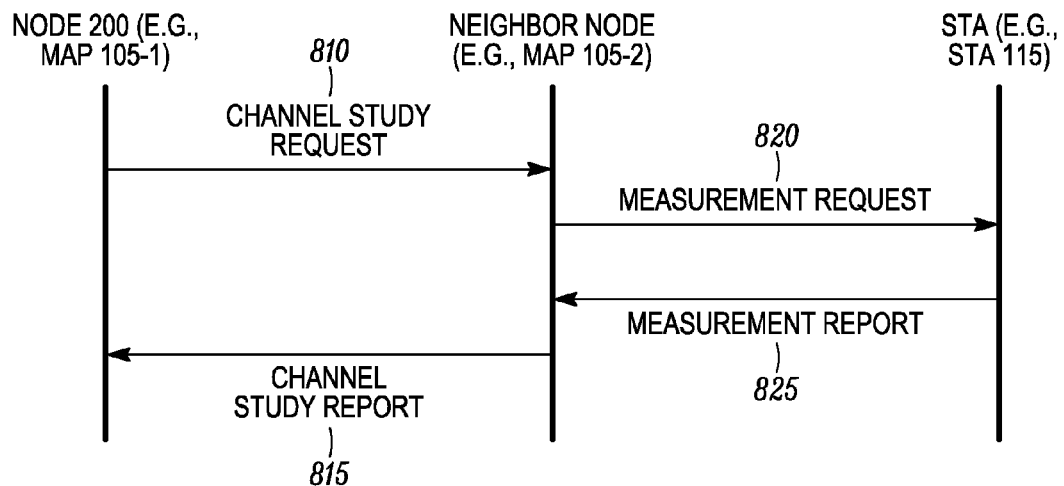
FIG. 8 is a message flow diagram illustrating the messages employed in the method of FIG. 7.

Now referring to FIG. 8, a message flow diagram 800 illustrating the messages used by a node 200 for obtaining channel information 235 is shown. The node 200 (e.g., MAP 105-1) sends a channel study request 810 to a neighbor node (e.g., MAP 105-2) for requesting channel information 235 from the neighbor node (MAP 105-2). After receiving the channel study request 810, the neighbor node (105-2) sends a measurement request 820 to one of its associated station 115. As used herein, measurement request is a request sent by the node 200 to its associated station for channel information 235. In response to receiving the measurement request 820, the associated station 115 sends a measurement report 825 to the neighbor node (MAP 105-2). The measurement report includes channel information 235, and is sent to the node 200 to which the station 115 is associated with. After receiving the measurement report 825, the neighbor node (MAP 105-2) sends the channel study report 815 to the node 200 (MAP 105-1). In accordance with some embodiments, when the neighbor node (MAP 105-2) has recent channel information 235, the neighbor node directly sends the channel study report 815 to the node 200 without sending measurement request 820 to its associated station 115.

Figure 9:
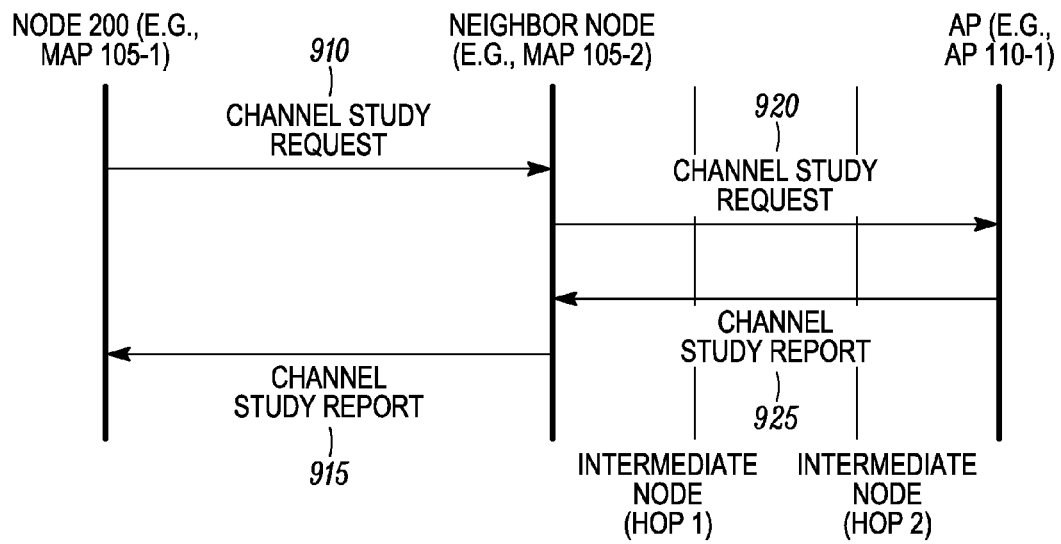
FIG. 9 is a message flow diagram illustrating the messages employed in the method of FIG. 7.

Now referring to FIG. 9, a message flow diagram 900 illustrating the messages used by a node 200 for obtaining channel information 235 from a node that is multi-hop away from node 200 is shown. The node 200 (e.g., MAP 105-1) sends a channel study request 910 to a neighbor node (e.g., MAP 105-2) capable of forwarding the channel study request 910 to a destination node (e.g., AP 110-1) directly or via one or more intermediate nodes. In response to receiving the channel study request 910, the neighbor node (MAP 105-2) forwards the channel study request 910 to the destination node (AP 110-1). For example, the neighbor node (MAP 105-2) sends the channel study request 910 via one or more intermediate nodes (e.g., MP 105). After receiving the channel study request 920, the destination node (AP 110-1) sends a channel study report 925 to the neighbor node (MAP 105-2) via one or more intermediate nodes (e.g., MP 105-4 and MAP 105-3). In response to receiving the channel study report 925, the neighbor node (MAP 105-2) forwards the channel study report 915 to the node 200 (MAP 105-1).

Figure 10:
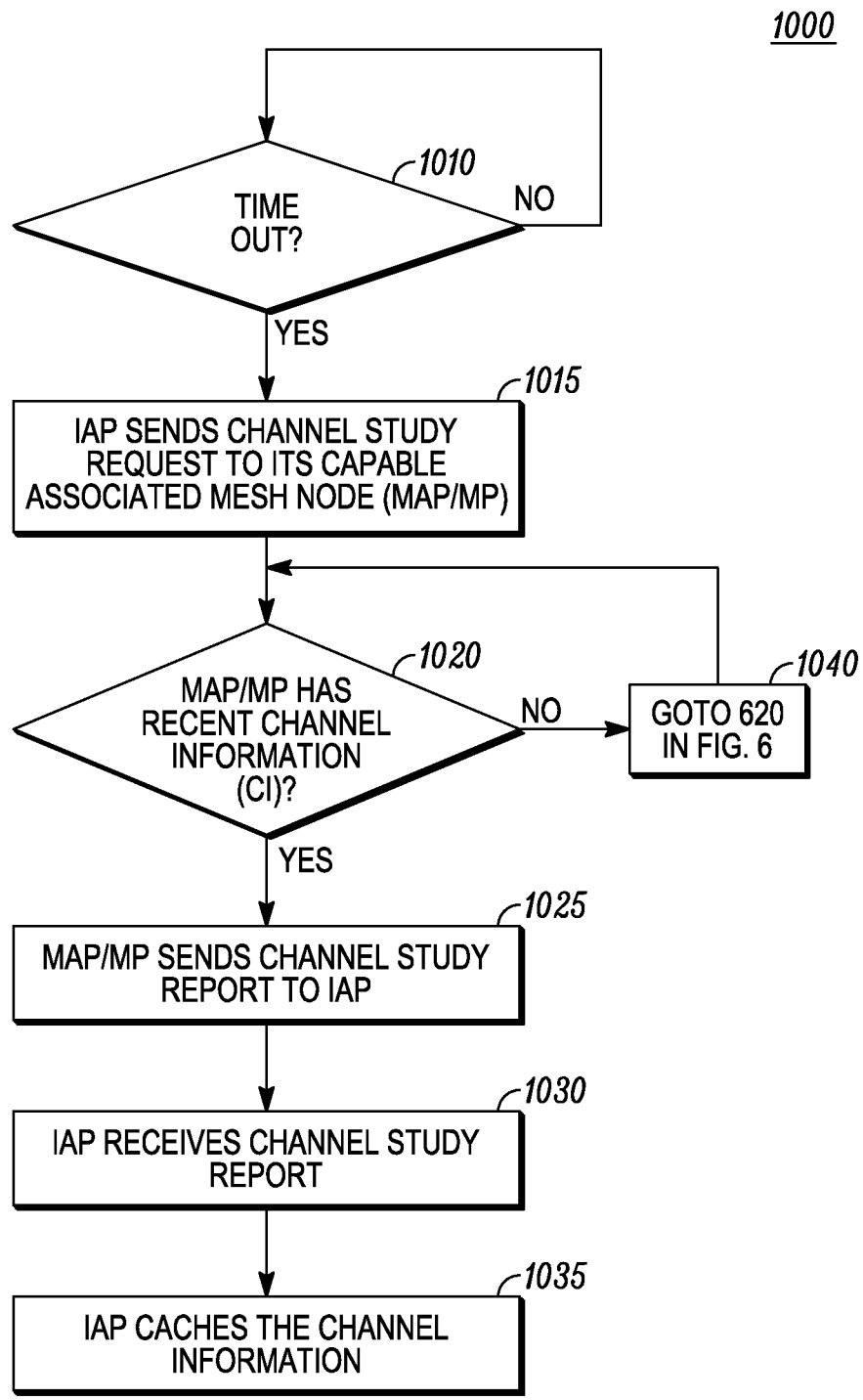
FIG. 10 is a flowchart of a method for obtaining channel information in a wireless communication network in accordance with some embodiments.

FIG. 10 is a flowchart of a method 1000 for obtaining channel information 235 in a wireless communication network in accordance with some embodiments. The method 1000 begins at step 1010 where an IAP 110 determines if a predefined interval of time has expired. If the IAP 110 determines that the predefined interval of time has not yet expired, then the IAP 110 continues to determine whether the predefined interval of time has expired. After the predefined interval of time has expired, the IAP 110 proceeds to step 1015 to send a channel study request 400 to its associated mesh access points/mesh points 105 that are capable of providing channel information 235. At step 1020, after receiving the channel study request 400, the mesh access points/mesh points 105 determine whether it has recent channel information 235. If the mesh access points/mesh points 105 determines that it has recent channel information 235, the mesh access points/mesh points 105 proceeds to step 1025 to send the channel information 235 via a channel study report 500 to the IAP 110. The IAP 110 receives the channel study report at step 1030, and caches/stores the channel information 235 at step 1035.

Returning to step 1020, when the mesh access points/mesh points 105 determines that it does not have recent channel information 235, at step 1025, the mesh access points/mesh points 105 obtains the channel information 235 from at least one station 115 associated with the mesh access points/mesh points 105 (see step 620, FIG. 6). In one embodiment, when the at least one associated station 115 is incapable of providing channel information 235, the mesh access points/mesh points 105 requests the channel information 235 from one of its neighbor nodes (see step 710, FIG. 7), and forwards the received channel information 235 via channel study report 500 to the IAP 110 as shown in step 1025. In one embodiment, the IAP 110 periodically updates the channel information 235 of other nodes in their memory 230. In this embodiment, the IAP 110 maintains the recent channel information 235 of other nodes so that the IAP 110 can facilitate sharing of recent channel information 235 of nodes 105 of the wireless communication network.

Figure 11:
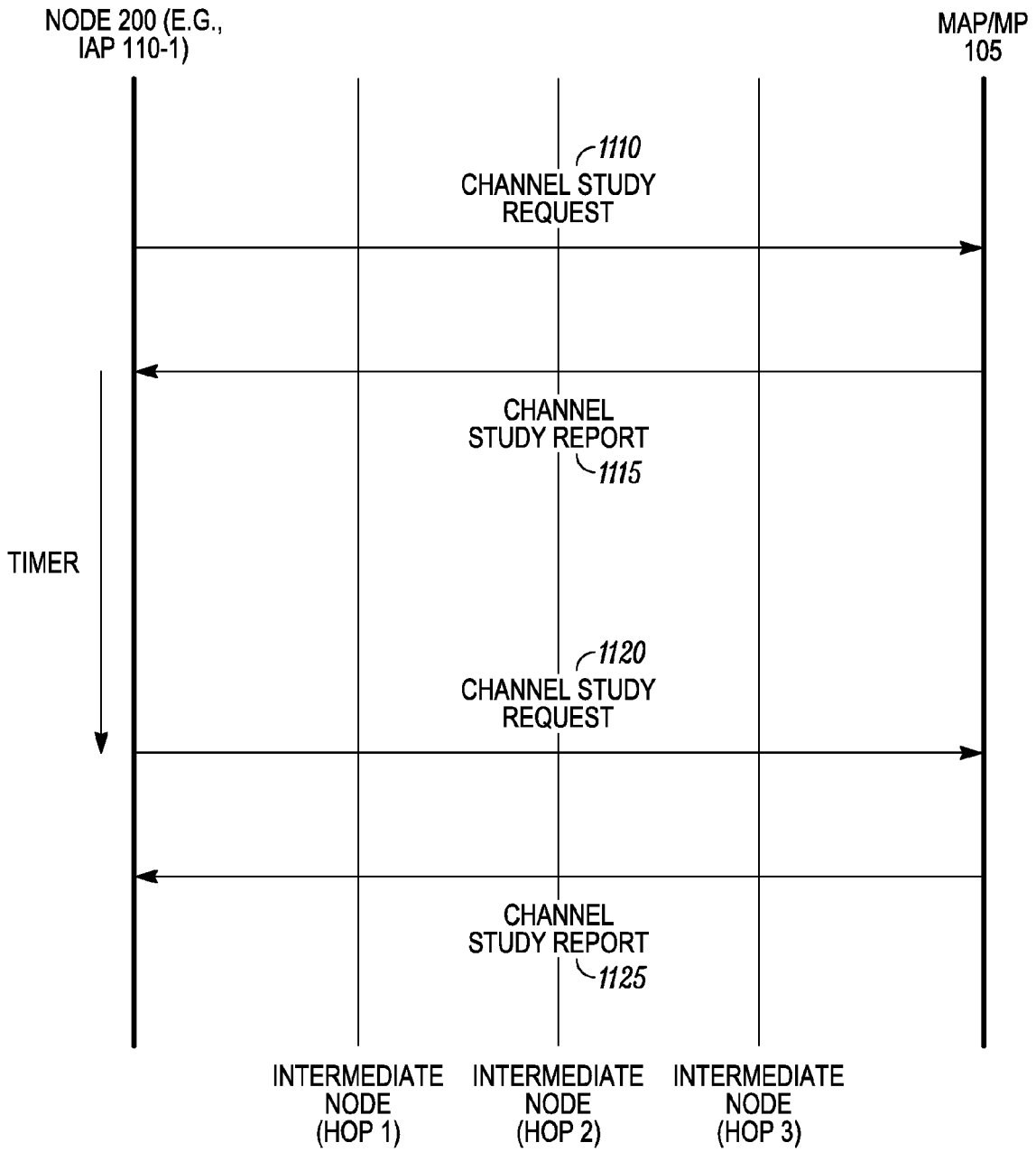
FIG. 11 is a message flow diagram illustrating the messages employed in the method of FIG. 10.

Now referring to FIG. 11, a message flow diagram 1100 illustrating the messages used by a node 200 for periodically obtaining channel information 235 is shown. The node 200 (e.g., IAP 110-1) sends a request for channel information 235 via channel study request 1110 to another node (e.g., MAP/MP 105). In accordance with some embodiments, the node 200 (IAP 110) sends the channel study request 1110 to another node (MAP/MP 105) via at least one intermediate node which is at least one hop away from the node 200 (IAP 110). In response to receiving the channel study request 1110, the node (MAP/MP 105) sends a channel study report 1115 to the node 200 (e.g., IAP 110-1). After a predefined interval of time has expired, the node 200 (IAP 110-1) again sends a channel study request 1120 to the other node (MAP/MP 105).

In response to receiving the channel study request 1120, the node (MAP/MP 105) sends the channel study report 1125 to the node 200 (IAP 110-1).

Figure 12:
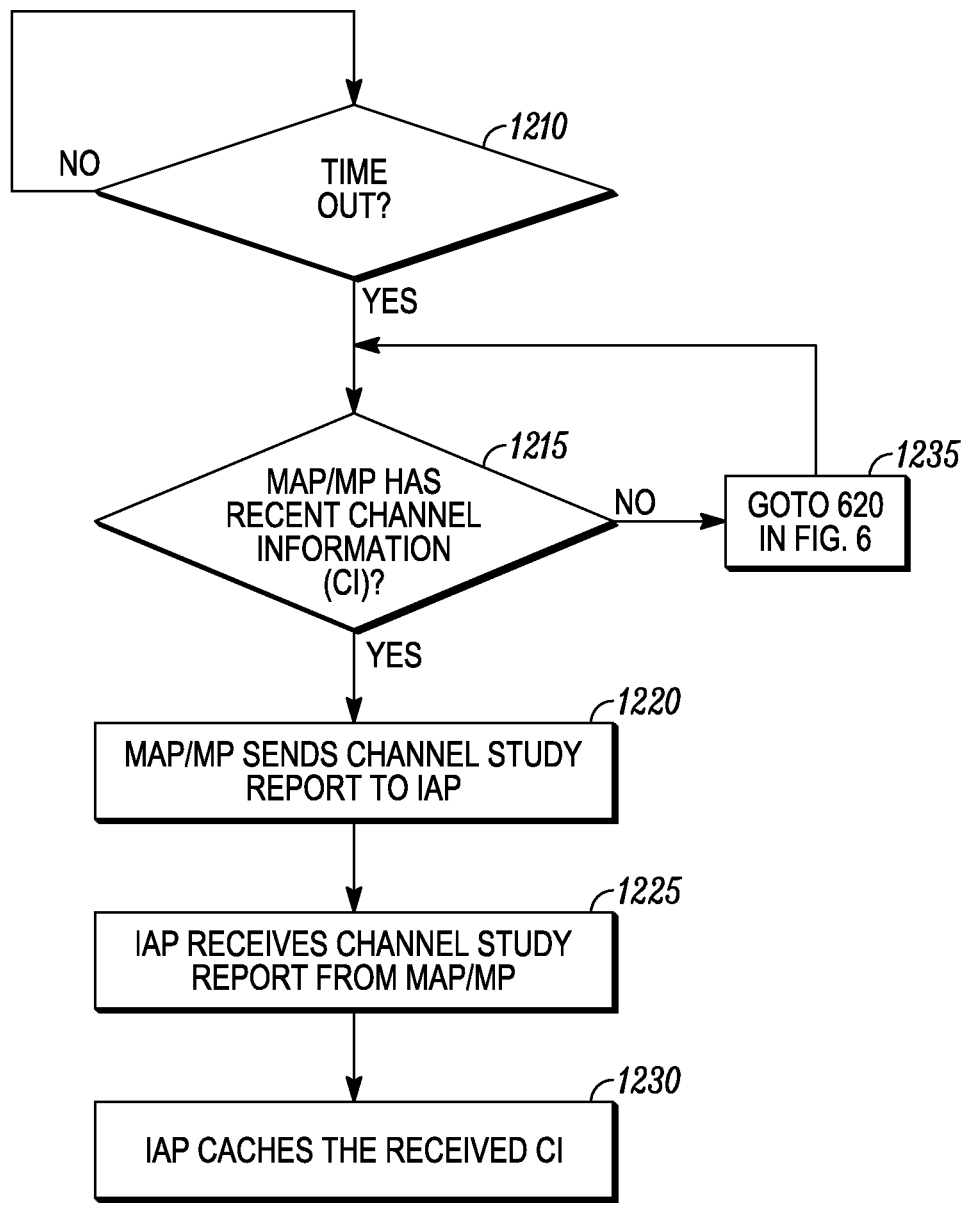
FIG. 12 is a flowchart of a method for obtaining channel information in a wireless communication network in accordance with some embodiments.

FIG. 12 is a flowchart of a method 1200 for providing channel information 235 in a wireless communication network in accordance with some embodiments. The method 1200 begins at step 1210 where an MAP/MP 105 determines if a predefined interval of time has expired. If the MAP/MP 105 determines that the predefined interval of time has not yet expired, then the MAP/MP 105 continues to determine whether the predefined interval of time has expired. After the predefined interval of time has expired, the MAP/MP 105 proceeds to step 1215 to determine whether it has recent channel information 235. If the MAP/MP 105 determines that it has recent channel information 235, the MAP/MP 105 proceeds to step 1220 to send the channel information 235 via a channel study report 500 to the IAP 110. The IAP 110 receives the channel study report at step 1225, and caches/stores the channel information 235 at step 1230.

Returning to step 1215, when the MAP/MP 105 determines that it does not have recent channel information 235, at step 1235, the MAP/MP 105 obtains the channel information 235 from at least one station 115 associated with the MAP/MP 105 (see step 620, FIG. 6). In one embodiment, when the at least one associated station 115 is incapable of providing channel information 235, the MAP/MP 105 requests the channel information 235 from one of its neighbor nodes (see step 710, FIG. 7), and forwards the received channel information 235 via channel study report 500 to the IAP 110 as shown in step 1220. In one embodiment, the IAP 110 periodically updates the channel information 235 of other nodes in their memory 230. In this embodiment, the IAP 110 maintains the recent channel information 235 of other nodes so that the IAP can facilitate sharing of recent channel information 235 of nodes 105 of the wireless communication network.

Figure 13:
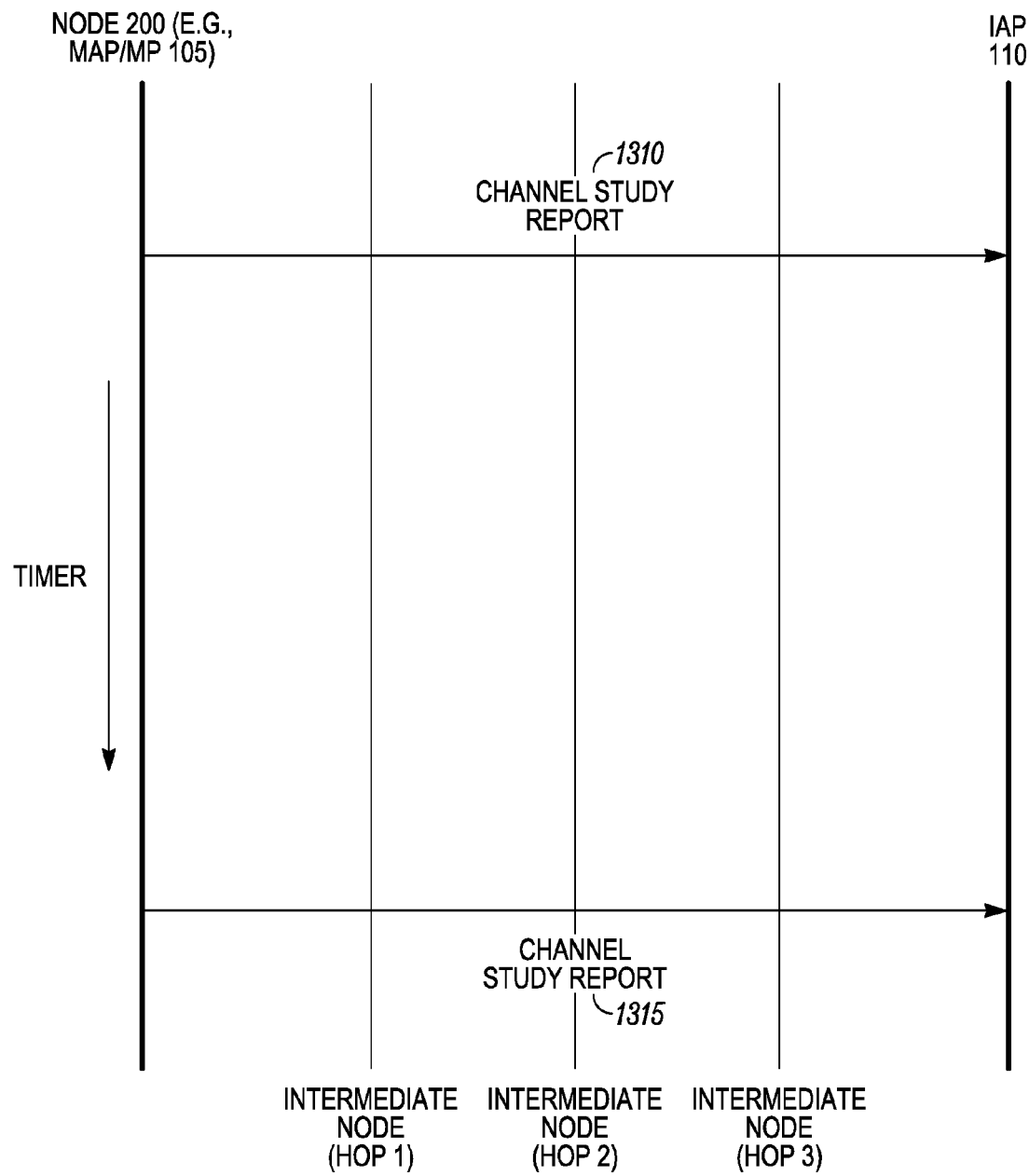
FIG. 13 is a message flow diagram illustrating the messages employed in the method of FIG. 12.

Now referring to FIG. 13, a message flow diagram 1300 illustrating the messages used by a node 200 for periodically providing channel information 235. The node 200 (e.g., MAP/MP 105) sends channel information 235 via channel study report 1310 to another node (e.g., IAP 110). In accordance with some embodiments, the node 200 (MAP/MP 105) sends the channel study report 1310 to another node (IAP 110) via at least one intermediate node which is at least one hop away from the node 200 (MAP/MP 105). After a predefined interval of time has expired, the node 200 (MAP/MP 105) again sends a channel study report 1315 including channel information 235 to the other node (IAP 110).

Figure 14:
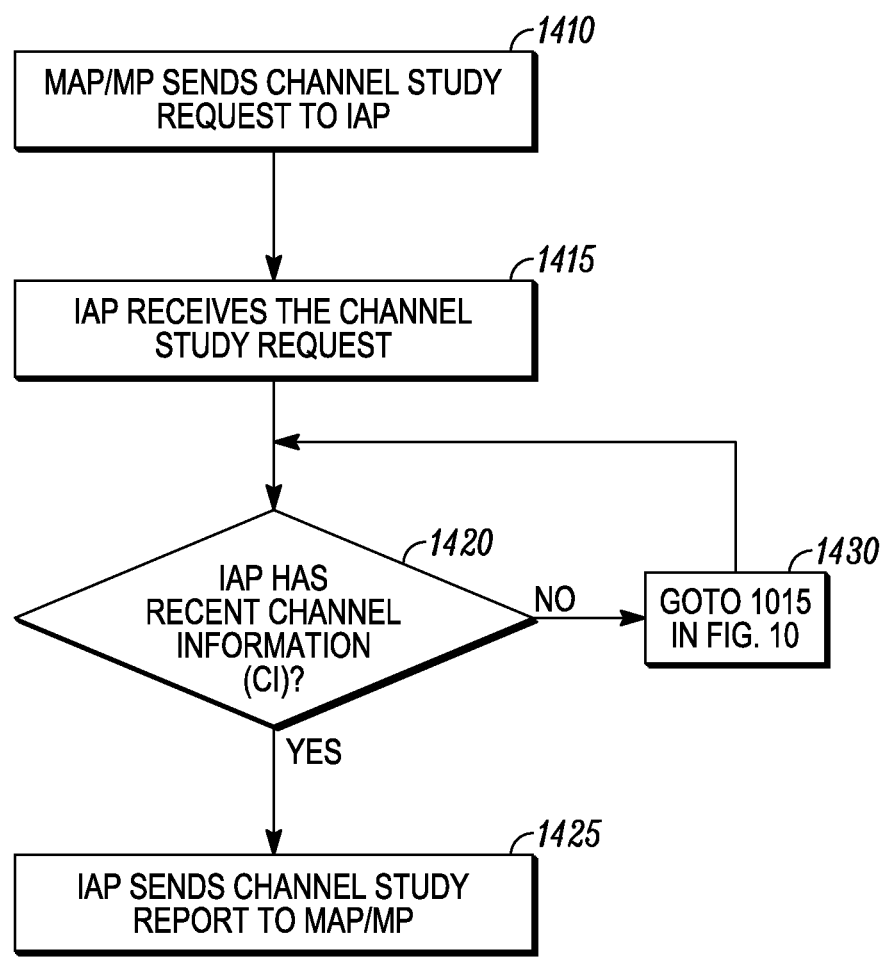
FIG. 14 is a flowchart of a method for obtaining channel information in a wireless communication network in accordance with some embodiments.

FIG. 14 is a flowchart of a method 1400 for obtaining channel information 235 in a multi-hop wireless communication network in accordance with some embodiments. The method 1400 begins at step 1410 where a node 200 (e.g., MAP/MP 105) sends a channel study request 400 to another node (e.g. IAP 110) via at least one intermediate node that is at least one hop away from the node 200 (MAP/MP 105). For example, when the node 200 (MAP/MP 105) is multi-hop away from the node (IAP 110), the neighborhood and the physical location of the node 200 and other node can be different. In this case, the channel information 235 assessed by the node 200 (MAP/MP 105) is different from the channel information 235 assessed by another node (IAP 110) that is multi-hop away from the node 200. In one embodiment, the node 200 (MAP/MP 105) sends a channel study request 400 including information related to at least one neighbor node, to the other node (IAP 110). Now at step 1415, the other node (IAP 110) receives the channel study request 400 including information related to the at least neighboring node from the node 200 (MAP/MP 105). In response to receiving the request, the other node (IAP 110) determines whether the other node has recent channel information 235 of at least one neighbor node of the requesting node 200 (MAP/MP 105). When the other node (IAP 110) has recent channel information 235 for the at least neighbor node, at step 1425, the other node (IAP 110) sends the channel information 235 of the at least one neighbor node to the requesting node 200 (MAP/MP 105) via a channel study report 500.

Returning to step 1420, when the other node (IAP 110) does not have recent channel information 235 of at least one neighbor node, the other node (IAP 110) proceeds to step 1430 to request channel information 235 from one or more of the neighbor nodes of the node 200 (MAP/MP 105) (see step 1015, FIG. 10). In accordance with some embodiments, the other node (IAP 110) selects at least one node from the at least one neighbor node by comparing the metric of each of the at least one neighbor node. The other node (IAP 110) sends a request for channel information to the selected node, and receives the channel information 235 from the selected node. The other node (IAP 110) forwards the received channel information 235 to the requesting node (MAP/MP 105).

Figure 15:
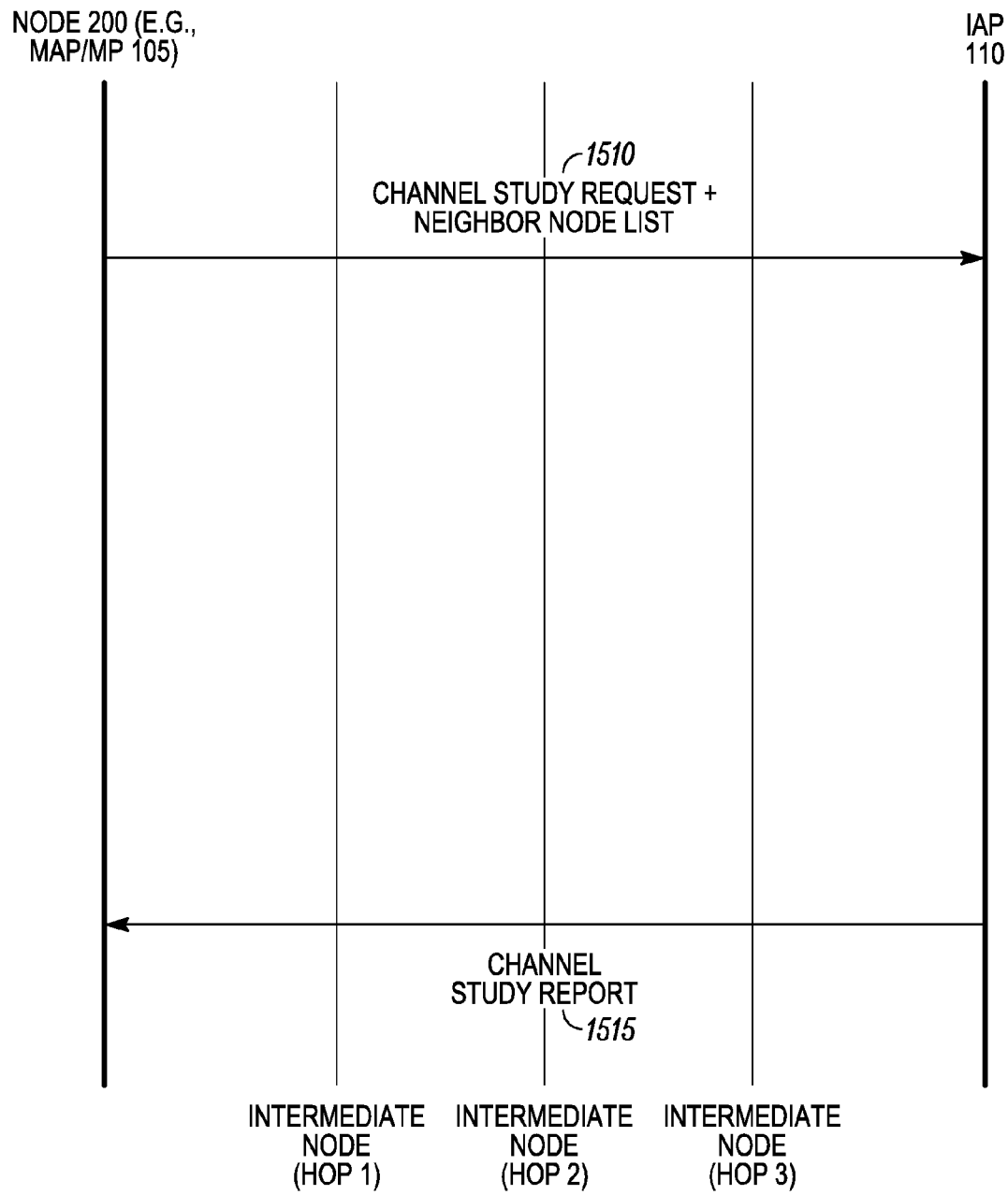
FIG. 15 is a message flow diagram illustrating the messages employed in the method of FIG. 14.

Now referring to FIG. 15, a message flow diagram 1500 illustrating the messages used by a node 200 for obtaining channel information 235 is shown. The node 200 (e.g., MAP/MP 105) sends a request for channel information 235 via channel study request 1510 and a neighbor node list including neighbor node list information related to at least one neighbor node, to another node (e.g., IAP 110). In accordance with some embodiments, the node 200 (MAP/MP 105) sends the channel study request 1510 and neighbor node list to another node (MAP/MP 105) via at least one intermediate node which is at least one hop away from the node 200 (MAP/MP 105). In response to receiving the channel study request 1510, the node (IAP 110) sends the channel information 235 of the at least one neighbor node of the node 200 (MAP/MP 105) via a channel study report 1515 to the node 200 (MAP/MP 105).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for obtaining channel information in a wireless communication network, comprising operating a node to:

receive periodically, information related to a channel assessment capability of each of a plurality of nodes operating within the wireless communication network wherein the information related to channel assessment capability comprises information regarding whether or not a node from the plurality of nodes can perform channel assessment;

maintain a metric characterizing the channel assessment capability for each of the plurality of nodes based on the received channel assessment capability;

select at least one node from the plurality of nodes by comparing the metric of each of the plurality of nodes;

send a request for channel information to the selected node; and receive channel information from the selected node.

2. The method of claim 1, wherein the metric characterizing the channel assessment capability for each of the plurality of nodes is based at least on a channel scanning capability of respective nodes or a channel scanning capability of at least one station associated with the respective nodes.

3. The method of claim 1, further comprising operating the node to:

send information related to channel assessment capability of the node to one or more other nodes of the plurality of nodes.

4. The method of claim 1, further comprising operating the node to:

determine whether at least one station associated with the node is capable of providing the channel information prior to sending information related to channel assessment capability.

5. The method of claim 4, further comprising operating the node to:

receive the channel information from the at least one station, when the at least one station is capable of providing the channel information to the node.

6. The method of claim 1, further comprising operating the selected node to:

determine that there is at least one station associated with the selected node that is capable of performing channel scanning when the selected node does not have the channel information, and receive the channel information from the at least one station associated with the selected node.

7. The method of claim 1, further comprising operating the selected node to:

determine that there is no station associated with the selected node that is capable of performing channel scanning when the selected node does not have the channel information, and send a report to the node about the channel assessment incapability of the selected node.

8. The method of claim 7, further comprising operating the selected node to:

receive the report from the selected node and to update the metric for the selected node to reflect the channel assessment incapability of the selected node.

9. The method of claim 1, wherein the request for channel information includes at least one of information related to at least one channel for which the channel information is requested, or information related to selected node from whom the channel information is requested, or information related to a type of channel information.

10. The method of claim 9, wherein the type includes at least one of scan for radar, or scan for unidentified signals, or scan for route metric to discovered access points or gateways, or scan for received signal power, or scan for channel bandwidth, or scan for channel occupancy per unit time.

11. The method of claim 1, wherein the received channel information includes at least one of radar, or unidentified signals on at least one channel for which the channel information is reported, or route metric information to discovered access points or gateways, or information of received signal power, or information of channel bandwidth, or information of channel occupancy per unit time.

12. The method of claim 1, further comprising operating the node to:
send the received channel information to neighbor nodes at predefined time intervals.

13. The method of claim 1, wherein the wireless communication network is a multi-hop wireless communication network.

14. The method of claim 13, wherein the multi-hop wireless communication network is a wireless mesh network.

15. The method of claim 1, wherein the node is at least one of a mesh access point, or mesh point, or intelligent access point, or a switch, or a router, or a central network authority.

16. A method for obtaining channel information in a multi-hop wireless communication network, comprising operating a node to:
receive periodically, information related to a channel assessment capability of each of a plurality of nodes operating within the wireless communication network wherein the information related to channel assessment capability comprises whether or not a node from the plurality of nodes can perform channel assessment;
maintain a metric characterizing the channel assessment capability of each of the plurality of nodes based on the received channel assessment capability;
select at least one node from the plurality of nodes by comparing the metric of each of the plurality of nodes;
determine at least one intermediate node that is capable of forwarding a request for channel information to the selected node, wherein the at least one intermediate node is at least one hop away from the node;
send the request for channel information to the selected node via the at least one intermediate node; and
receive channel information from the selected node.

17. The method of claim 16, wherein, operating the node to receive channel information from the selected node comprises:
operating the selected node to determine at least one intermediate node that is capable of forwarding the channel information to the node, and
operating the selected node to receive channel information from the selected node via the at least one intermediate node determined by the selected node.

18. The method of claim 16, wherein the request includes at least one of information related to at least one channel for which the channel information is requested, or
information related to selected node from whom the channel information is requested, or
information related to a type of channel information.

19. The method of claim 18, wherein the type includes at least one of scan for radar, or scan for unidentified signals, or scan for route metric to discovered access points or gateways, or scan for received signal power, or scan for channel bandwidth, or scan for channel occupancy per unit time.

20. The method of claim 16, wherein the received channel information includes at least one of radar, or unidentified signals on at least one channel for which the channel information is reported, or route metric information to discovered access points or gateways, or information of received signal power, or information of channel bandwidth, or information of channel occupancy per unit time.

21. A method for providing channel information in a wireless communication network, comprising:
receiving periodically, information related to a channel assessment capability of each of a plurality of nodes operating within the wireless communication network wherein the information related to -channel assessment capability comprises information regarding whether a node from the plurality of nodes can perform channel assessment and further wherein the plurality of nodes comprise one or more neighbor nodes of a requesting node;
maintaining a metric characterizing the channel assessment capability of each of the plurality of nodes based on the received channel assessment capability;
receiving from the requesting node, a request for channel information, including information related to the one or more neighbor nodes of the requesting node;
in response to receiving the request, determining whether the channel information related to the one or more neighbor nodes is locally maintained;
when the channel information related to the one or more neighbor nodes is locally maintained,
sending the channel information of the one or more neighbor nodes to the requesting node; and
when the channel information related to the one or more neighbor nodes is not locally maintained,
selecting a node from the one or more neighbor nodes, based on the metric of each of the one or more neighbor nodes,
sending a request for channel information to the selected node,
receiving the channel information from the selected node, and
sending the channel information of selected node to the requesting node.

22. The method of claim 21, wherein the request includes at least one of
information related to at least one channel for which the channel information is requested, or
information related to selected node from whom the channel information is requested, or
information related to a type of channel information.

23. The method of claim 22, wherein the type includes at least one of scan for radar, or scan for unidentified signals, or scan for route metric to discovered access points or gateways, or scan for received signal power, or scan for channel bandwidth, or scan for channel occupancy per unit time.

24. The method of claim 21, wherein the received channel information includes at least one of radar, or unidentified signals on at least one channel for which the channel information is reported, or route metric information to discovered access points or gateways, or information of received signal power, or information of channel bandwidth, or information of channel occupancy per unit time.

25. The method of claim 21, wherein the node is at least one of a mesh access point, or mesh point, or intelligent access point, or a switch, or a router, or a central network authority.

26. A wireless mesh network for facilitating sharing of channel information, comprising:
a plurality of mesh nodes; and
at least one intelligent access point capable of connecting at least one of the mesh nodes to a wired backbone; and
wherein each mesh node and intelligent access point:
receive periodically, information related to a channel assessment capability of each of the mesh nodes wherein, the information related to channel assessment capability comprises information regarding whether or not a mesh node from the plurality of mesh nodes can perform channel assessment, maintain a metric characterizing the channel assessment capability for each of the plurality of mesh nodes, select at least one mesh node based by comparing the metric of each of the plurality of mesh nodes, send a request for channel information to the selected mesh node, receive channel information from the selected mesh node, and share the received channel information to other mesh nodes and intelligent access points of the wireless mesh network.

27. The method of claim 1, wherein the information related to channel assessment capability further comprises information regarding whether or not the node from the plurality of nodes can share channel information.

28. The method of claim 16, wherein the information related to channel assessment capability further comprises information regarding whether or not the node from the plurality of nodes can share channel information.

29. The method of claim 21, wherein the information related to channel assessment capability further comprises information regarding whether or not the node from the plurality of nodes can share channel information.

30. the system of claim 26, wherein the information related to channel assessment capability further comprises information regarding whether or not the mesh node from the plurality of mesh nodes can share channel information.

* * * * *